United States Patent
Dorbie

(10) Patent No.: US 6,614,445 B1
(45) Date of Patent: Sep. 2, 2003

(54) ANTIALIASING METHOD FOR COMPUTER GRAPHICS

(75) Inventor: Angus Dorbie, Mountain View, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/274,169

(22) Filed: Mar. 23, 1999

(51) Int. Cl.[7] ................................................. G09G 5/00
(52) U.S. Cl. .......................................... 345/582; 345/611
(58) Field of Search ................................. 345/428, 430, 345/136, 611, 582, 616, 613, 615, 698, 588

(56) References Cited

U.S. PATENT DOCUMENTS

| | | | | |
|---|---|---|---|---|
| 4,888,713 A | * | 12/1989 | Falk | 364/522 |
| 5,123,082 A | * | 6/1992 | Shimada | 395/102 |
| 5,579,456 A | * | 11/1996 | Cosman | 345/428 |
| 6,219,064 B1 | * | 4/2001 | Kamen et al. | 345/430 |
| 6,222,551 B1 | * | 4/2001 | Schneider et al. | 345/419 |
| 6,232,981 B1 | * | 5/2001 | Gossett | 345/430 |
| 6,271,847 B1 | * | 8/2001 | Shum et al. | 345/418 |
| 6,275,235 B1 | * | 8/2001 | Morgan, III | 345/430 |

OTHER PUBLICATIONS

Web pages: "3.2 Antialiasing", Silicon Graphics, Copyright ©1994, 1995, 2 pages.
Web pages: "Anisotropic Performer Demo Explanation", Silicon Graphics Developer's Toolbox, Copyright ©1998, 5 pages.
Michael A. Cosman, et al., "CIG Scene Realism: The World Tomorrow", Evans & Sutherland Computer Corporation, 17 pages.

* cited by examiner

*Primary Examiner*—Mark Zimmerman
*Assistant Examiner*—Scott Wallace
(74) *Attorney, Agent, or Firm*—Woodcock Washburn LLP

(57) ABSTRACT

A method and apparatus for improving the quality of images that include aliased pixels is provided. For the method of the present invention, one or more portions of an image are selected for antialiasing. Each selected portion is rendered at a higher than normal resolution into a frame buffer and then read back into as a texture in to a cache or other memory. The texture is then filtered back to its original size. The filtering operation supersamples the texture. The resulting texture is antialiased and anisotropic to a degree that matches the resize. The antialiased texture is then applied to a quadrilateral in the frame buffer.

18 Claims, 3 Drawing Sheets

ANTIALIASING METHOD FOR COMPUTER GRAPHICS

FIELD OF THE INVENTION

This application relates generally to systems for computer graphics. More specifically, the present invention includes a method and apparatus for improving the quality of images that include aliased pixels.

BACKGROUND OF THE INVENTION

Computer systems (and related devices) typically create three-dimensional images using a sequence of stages known as a graphics pipeline. During early pipeline stages, images are modeled using a mosaic-like approach where each image is composed of a collection of individual points, lines and polygons. These points, lines and polygons are know as primitives and a single image may require thousands, or even millions, of primitives. Each primitive is defined in terms of its shape and location as well as other attributes, such as color and texture.

The primitives used in early pipeline stages are transformed, during a rasterization stage, into collections of pixels. The rasterization stage is often performed by a specialized graphics processor (in low-end systems, rasterization may be performed directly by the host processor) and the resulting pixels are stored in a device known as a frame buffer. A frame buffer is a memory device that includes individual memory locations for each pixel.

During the rasterization stage, the graphics processor renders each primitive into the frame buffer. The graphics processor accomplishes this task by determining which frame buffer memory locations are included within the bounds of each primitive. The included memory locations are then initialized to reflect the attributes of the primitive, including color and texture.

Textures are the visual or tactile surface characteristics and appearance of an object. Depicting texture in a realistic manner is an important part of making three-dimensional images believable and is usually done by mapping texture images onto the primitives within an image. This process is known as texture mapping.

To be realistic, the texture mapping process must be configured to account for varying distances within an image. Textures that appear realistic when applied to nearby objects must be adjusted before they are applied to more distant objects. In many cases, this is done by precomputing a series of images to represent a single texture at different distances. The first image has the highest resolution and covers the greatest pixel area. Each succeeding image has a lower resolution and covers a smaller pixel area. The graphics system dynamically selects the correct image from the series based on the distance to the eye point and viewing angle. The entire series is typically stored in a data structure known as a mipmap.

While effective, the use of mipmaps and other pre-filtered texture images does not entirely solve the problem of applying textures to represent varying distances. This follows because mipmaps are typically generated isotropically. Each succeeding image is a square that is half as tall and half as wide as the preceding image. Unfortunately, objects within images don't scale isotropically. Instead, objects both narrow and lengthen as they move from near to far. An object that is square when viewed in the foreground will appear rectangular when it is viewed at a distance. This causes problems when textures are applied to distant objects. Textures that are chosen to match an object's width may fall short of matching the object's height. Conversely, textures that match an object's height are often too wide for the object's width.

This type of mismatch means that the texturing process must be reconfigured to avoid pixel aliasing. This is typically accomplished by using lower resolution textures that are correctly dimensioned for one direction. Unfortunately, this causes the textures to blur along a second, orthogonal direction. This blurring is the visual result of information that is lost during the texturing process.

Texturing is not the only time at which pixel aliasing is a cause for concern. In fact, pixel aliasing occurs for many reasons. Aliasing can occur, for example, wherever two primitives overlap or at the edge of a primitive. Within regions of overlap, pixels can be split between multiple primitives. Rendering a pixel based on the attributes of one of these primitives can cause the pixel to be incorrectly rendered for remaining primitives. Aliasing of this type often results in stair step or otherwise jagged boundaries between overlapping primitives.

The overall effect of pixel aliasing is a reduction in image quality. As a result, a number of antialiasing methods have been developed. These methods attempt to reduce the number of aliased pixels or render them in a way that hides their aliased nature. Unfortunately, most of these methods require specialized hardware support to execute efficiently. This makes these methods unavailable in systems that do not include the required hardware support. Most antialiasing methods are also applied on an whole image basis. This means that antialiasing is applied to an entire image, even where it is only required for a small portion. This can be inefficient and increase the time required to render complex images.

For these reasons, a need exists for improving the quality of images that include aliased pixels. This need is particularly important where mipmaps are constructed using isotropic scaling and particularly important for systems that do not provide specialized antialiasing hardware.

SUMMARY OF THE INVENTION

An embodiment of the present invention includes a method and apparatus for improving the quality of images that include aliased pixels. For the method of the present invention, one or more portions of an image are selected for antialiasing. The selection process is preferably tailored to choose the image portions where highly accurate rendering is most important. In a flight simulator, these image portions might include the depictions of other aircraft or targets. In other cases, it may be practical to select the entire image for processing.

Each selected portion is rendered into the frame buffer. The resolution used for this rendering is higher than the original resolution of the selected image portion. For example, an image portion that normally would occupy a sixteen by sixteen pixel grid might be rendered as a forty-eight by forty-eight grid of pixels.

After rendering each image portion is read back from the frame buffer into a texture memory or texture cache. The image portions are now treated as textures. Each textures is applied to a quadrilateral that is drawn orthogonally to the viewer in the frame buffer. The quadrilaterals are sized to match the normal resolution of the image portions. As a result, the textures (which are created at a higher resolution) must be filtered to fit their quadrilaterals. The texturing hardware performs this process using weighted averages of the pixels included in the textures. The overall result is that the quadrilaterals are supersampled from the original image. This improves antialiasing and ensures that the textures applied to the quadrilaterals are anisotropic to a degree that matches the image resize.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now by made in detail to preferred embodiments of the invention, examples of which are illustrated in the accompanying drawings. Wherever convenient, the same reference numbers will be used throughout the drawings to refer to the same of like parts.

Environment

Figure 1:
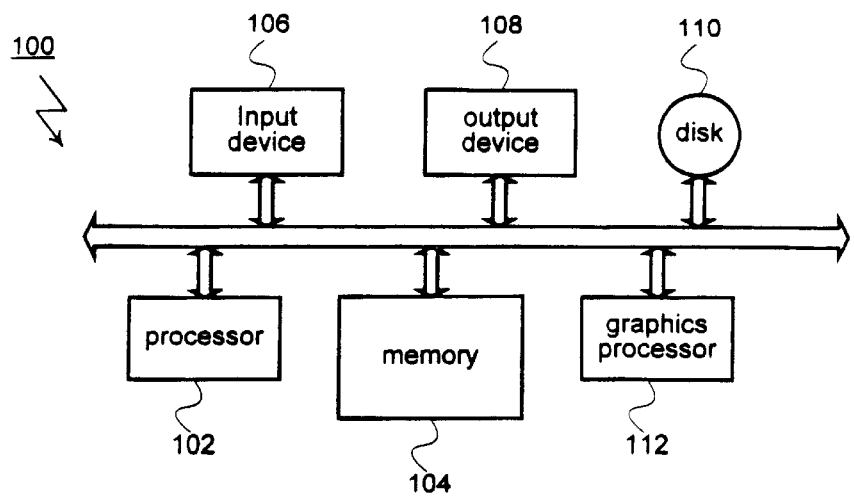
FIG. 1 is a block diagram of a host computer system shown as an exemplary environment for an embodiment of the present invention.

In FIG. 1, a computer system 100 is shown as a representative environment for the present invention. Structurally, computer system 100 includes a processor, or processors 102, and a memory 104. An input device 106 and an output device 108 are connected to processor 102 and memory 104. Input device 106 and output device 108 represent a wide range of varying I/O devices such as disk drives, keyboards, modems, network adapters, printers and displays. Each node 102 may also includes a disk drive 110 of any suitable disk drive type (equivalently, disk drive 110 may be any non-volatile mass storage system such as "flash" memory). Computer system 100 also preferably includes a graphics processor 112 of any suitable type. Graphics processor 112 implements all of the tasks required to translate graphics primitives and attributes to displayable output.

Figure 2:
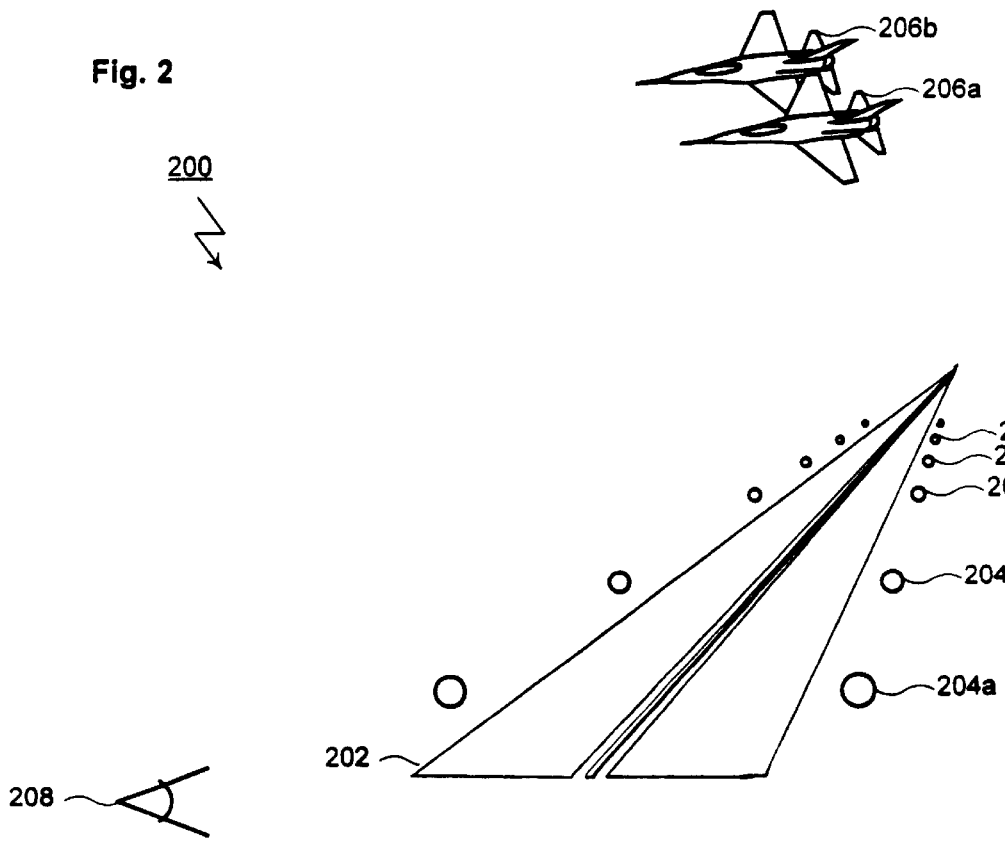
FIG. 2 is a sample image shown as a potential application for the present invention.

An embodiment of the present invention includes a method and apparatus for improving the quality of images that include aliased pixels. The method and apparatus of the present invention are better understood by reference to FIG. 2 where a representative image is shown and generally designated 200. Image 200 depicts a runway 202 surrounded by a series of runway lights, of which runway lights 204a through 204e are representative. Image 200 also includes aircraft 206a and 206b. Image 200 is shown with an eye point 208. Eye point 208 represents the position at which image 200 is viewed. Eye point 208 is intended to be movable relative to image 200. This means that components of image 200, including runway 202, runway lights 204 and aircraft 206 may be viewed from a range of positions.

Antialiasing Method

Figure 3:
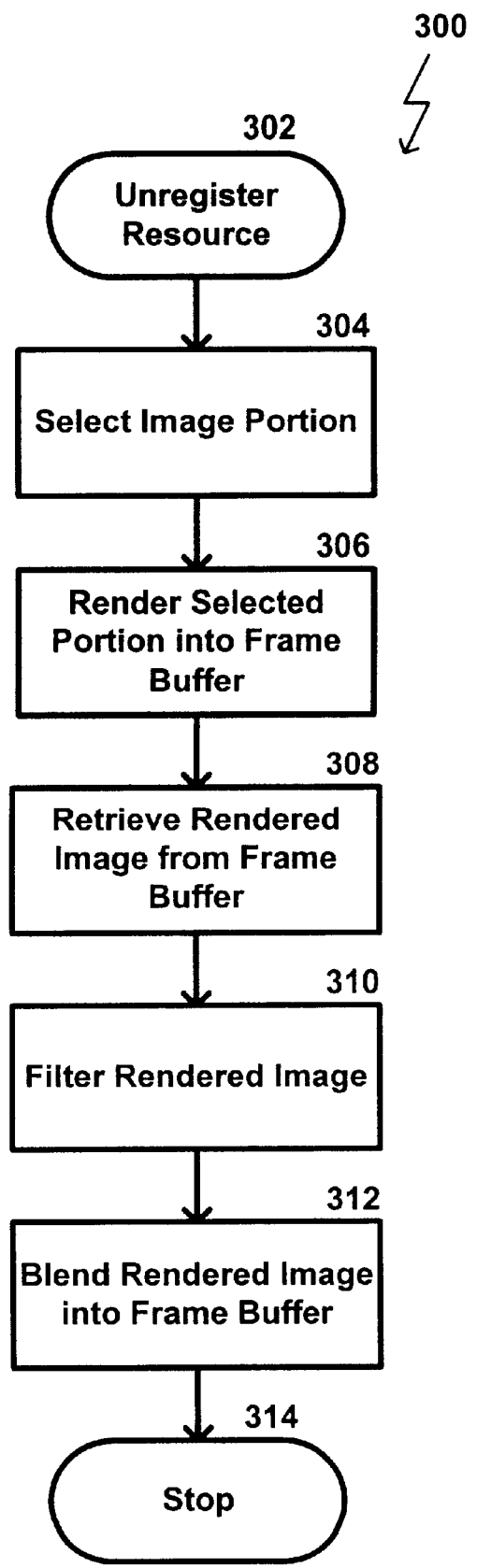
FIG. 3 is a flowchart showing the steps associated with an embodiment of the antialiasing method of the present invention.
Figure 4:
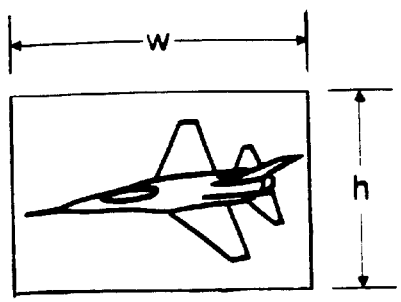
FIG. 4 is a portion of the image of FIG. 2 as selected by the method of FIG. 3.

An embodiment of the antialiasing method is shown is designated 300 in FIG. 3. Method 300 begins, symbolically, with start placeholder 302. In step 304, computer system 100 selects an image portion to be antialiased. In general, any portion of an image may be selected, including the entire image. In many cases, however, it will be preferably to apply the method to one or more image portions. These portions may be areas where pixel aliasing is likely to be present. Alternatively, the selected image portions may be areas where realistic rendering is highly important. For the example of FIG. 2, aircraft 206 represent regions where realistic rendering may be highly important. Based on this, FIG. 4 shows aircraft 206a as an image portion selected for antialiasing.

Figure 5:
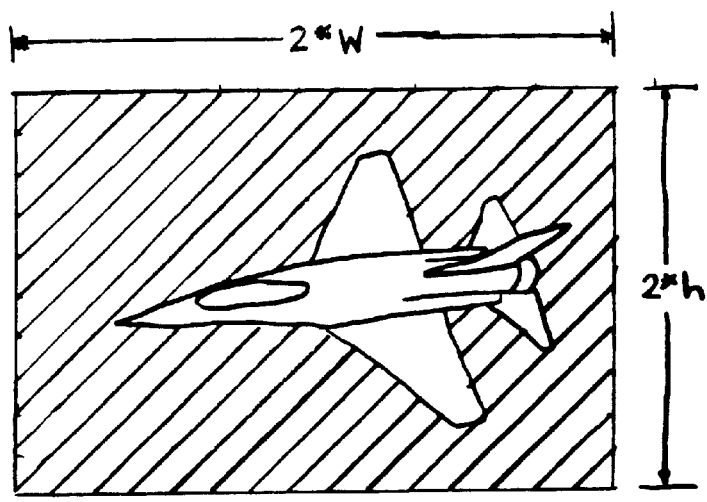
FIG. 5 shows the image portion of FIG. 4 as rendered by the method of FIG. 3.

In step 306, computer system 100 renders the selected image portion into its frame buffer. The selected image portion is rendered at a size that exceeds the original size of the selected image portion. Typically, the magnification will be a power of two, such as two, four or sixteen. This is shown in FIG. 5, where magnification by a factor of two has been used to create a rendered image that is twice as wide and twice as high and the selected portion of FIG. 4.

In step 308, computer system 100 retrieves the rendered image portion from the frame buffer. The rendered image portion is treated as a texture having the magnified dimensions of the rendered image portion. Computer system 100 stores this texture in a texture cache or other memory.

In step 310, computer system 100 minifies the texture retrieved in the previous step so that it matches the size of the image portion selected in step 304. In many cases, computer system 100 will include specialized hardware to perform this type of filtering. Where specialized hardware is not provided, the texture may be filtered by software. Method 300 shows minification as a separate step. It should be appreciated that this is representative, and that minification can be performed any time between step 308 and step 312, inclusive. Thus, minification may be performed as part of image readback (step 308) or image rendering (step 312).

Figure 6:
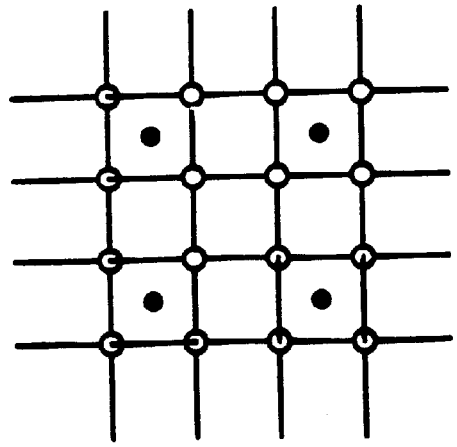
FIG. 6 is a block diagram showing the relationship between pixels before and after filtering.

In general, a wide range of methods may be used to filter the texture. One method is to form pixels within the filtered texture using weighted averages of adjacent pixels in the unfiltered texture. This can be better understood by reference to FIG. 6 where a series of pixels from an unfiltered texture are shown as unfilled circles. Corresponding pixels from a filtered texture are shown as filled circles. Each pixel from the filtered texture is formed as a weighted average of the four surrounding pixels from the unfiltered texture. In this method, often referred to as bilinear filtering, each pixel in the filtered texture replaces four pixels in the unfiltered texture. This four to one reduction in pixels creates a filtered texture that is half as high, and half as wide, and the unfiltered texture.

Regardless of the filtering method used, the overall effect is to supersample pixels in the unfiltered texture. Each pixel in the filtered texture is formed as blend of multiple pixels in the unfiltered texture. This improves antialiasing within the filtered texture. In particular, it ensures that the filtered texture is anisotropic to a degree that matches the reduction in image size between the unfiltered texture and the filtered texture.

In step 312, computer system 100 applies the minified texture to a quadrilateral within the frame buffer. The quadrilateral is dimensioned to replicate the size of the image portion selected in step 304. It should be noted that step 310 (minification) and step 312 (application to the quadrilateral) are described separately only for the purposes of description. In many environments, these steps may be performed as part of a single atomic operation.

The application performed in step 312 is preferably configured to correctly model the visibility of the image portion within the scene being rendered. One way to accomplish this goal is to use alpha or transparency blending. The use of alpha or transparency blending in step 312 is enhanced if step 306 (rendering of the selected image portion in the frame buffer) is modified to use a black background. This prevents the background from contributing to the appearance of any non-opaque regions of the selected image portion. A second way to model visibility is to use depth information (i.e., Z-buffer values). To use depth information, step 312 is modified to draw the textured quadrilateral at a constant depth within the frame buffer. The constant depth defines which portions of the scene being rendered lie in front of the textured quadrilateral and which portions of the image being rendered lie behind the textured quadrilateral.

As discussed, the selected image portion is magnified and the resulting texture is minified (see steps 306 and 310). In the described embodiment the degree of magnification matches the degree of minification and is typically an even power of two, such as two, four or sixteen. The actual degree chosen depends on several factors. One of these is the amount of antialiasing needed. Higher degrees of magnification and minification yield more complete antialiasing. The degree of magnification and minification chosen also depends on the hardware support provided by computer system 100. In many cases, computer systems will include specialized hardware that performs the minification required by step 310. Most environments that provide this type of support do so only for predefined degrees of minification. In these cases, it is preferable to configured the antialiasing process to use the degree of minification for which hardware support is provided.

In some cases, the minification process (step 310) may be repeated in cascaded fashion. For example, a single texture may be minified twice using the same four-to-one reduction. This would provide a sixteen-to-one reduction and may be used in environments where direct support for sixteen-to-one reductions is not provided. In the context of Method 300, the overall minification (i.e., the result of the cascaded filtering) would match the magnification factor used in step 306.

Other embodiments be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for antialiasing a graphics image, the method comprising:

selecting an image portion of the graphics image;

rendering the image portion at a higher resolution than the graphics image to create a texture;

retrieving the rendered image portion as a texture;

filtering the texture to produce a minified texture; and applying the minified texture to a quadrilateral orthogonally drawn with respect to a viewer of the graphics image.

2. A method as recited in claim 1 wherein the step of rendering the image portion is performed using a black background and wherein the step of applying the texture to a quadrilateral is performed using transparency information.

3. A method as recited in claim 1 wherein the quadrilateral is defined to have a constant depth value, the constant depth value chosen to correctly determine visibility for the quadrilateral within the graphics image.

4. A method as recited in claim 1 wherein the step of filtering the texture is performed using a bilinear filter so that each pixel in the minified texture is a weighted average of four pixels in the texture.

5. A method as recited in claim 1 wherein the selected image portion is the entire graphics image.

6. A method as recited in claim 1 wherein the step of filtering the texture is repeated sequentially to produce the minified texture.

7. A computer program product comprising a computer usable medium having computer readable code embodied therein, the computer readable program code configured to cause a computer system to perform a method for antialiasing a graphics image, the method comprising:

rendering an image portion of the graphics image at a higher resolution than the graphics image to create a texture;

retrieving the rendered image portion as a texture;

filtering the texture to produce a minified texture; and applying the minified texture to a quadrilateral orthogonally drawn with respect to a viewer of the graphics image.

8. A computer program product as recited in claim 7 wherein the step of rendering the image portion is performed using a black background and wherein the step of applying the texture to a quadrilateral is performed using transparency information.

9. A computer program product as recited in claim 7 wherein the quadrilateral is defined to have a constant depth value, the constant depth value chosen to correctly determine visibility for the quadrilateral within the graphics image.

10. A computer program product as recited in claim 7 wherein the step of filtering the texture is performed using a bilinear filter so that each pixel in the minified texture is a weighted average of four pixels in the texture.

11. A computer program product as recited in claim 7 wherein the selected image portion is the entire graphics image.

12. A computer program product as recited in claim 7 wherein the step of filtering the texture is repeated sequentially to produce the minified texture.

13. A system for antialiasing a graphics image which comprises:

means for causing a computer system to render an image portion of the graphics image at a higher resolution than the graphics image to create a texture;

means for causing the computer system to retrieve the rendered image portion as a texture;

means for causing the computer system to filter the texture to produce a minified texture; and means for causing the computer system to apply the minified texture to a quadrilateral orthogonally drawn with respect to a viewer of the gragphics images.

14. A system as recited in claim 13 wherein the means for causing the computer system to render the image portion is configured to use a black background and wherein the means for applying the texture to a quadrilateral is configured to use transparency information.

15. A system as recited in claim 13 wherein the quadrilateral is defined to have a constant depth value, the constant depth value chosen to correctly determine visibility for the quadrilateral within the graphics image.

16. A system as recited in claim 13 wherein the means for filtering the texture is configured to use a bilinear filter so that each pixel in the minified texture is a weighted average of four pixels in the texture.

17. A system as recited in claim 13 wherein the selected image portion is the entire graphics image.

18. A system as recited in claim 13 wherein the means for filtering the texture is configured to repeatedly filter the texture to produce the minified texture.

* * * * *